US011122749B2

(12) United States Patent
Villaflores et al.

(10) Patent No.: US 11,122,749 B2
(45) Date of Patent: Sep. 21, 2021

(54) PLANT PROPAGATION INCUBATOR

(71) Applicant: M2 Labs, San Diego, CA (US)

(72) Inventors: Kimberly Villaflores, San Diego, CA (US); Kyle Robinson, San Diego, CA (US)

(73) Assignee: M2 Labs, San Diego, CA (US)

(*) Notice: Subject to any disclaimer, the term of this patent is extended or adjusted under 35 U.S.C. 154(b) by 572 days.

(21) Appl. No.: 15/707,894

(22) Filed: Sep. 18, 2017

(65) Prior Publication Data

US 2019/0082622 A1   Mar. 21, 2019

(51) Int. Cl.
| | | |
|---|---|---|
| A01G 9/26 | (2006.01) | |
| A01G 9/24 | (2006.01) | |
| A01G 9/029 | (2018.01) | |
| A01G 9/16 | (2006.01) | |
| A01G 31/02 | (2006.01) | |

(52) U.S. Cl.
CPC ............. *A01G 9/26* (2013.01); *A01G 9/0297* (2018.02); *A01G 9/16* (2013.01); *A01G 9/246* (2013.01); *A01G 9/247* (2013.01); *A01G 31/02* (2013.01)

(58) Field of Classification Search
USPC ............. 119/311–328; 47/19.1, 19.2, 60, 61, 47/62 A
See application file for complete search history.

(56) References Cited

U.S. PATENT DOCUMENTS

| | | | | |
|---|---|---|---|---|
| 2,296,860 A | * | 9/1942 | Martin | A01C 1/02 47/18 |
| 4,198,783 A | * | 4/1980 | Leroux | A01G 31/02 47/17 |
| 4,312,152 A | * | 1/1982 | Drury | A01G 31/02 47/62 R |
| 5,983,564 A | * | 11/1999 | Stragnola | A01G 9/247 47/62 R |
| 8,327,580 B2 | * | 12/2012 | Miyahara | A01G 9/16 47/60 |
| 10,123,491 B2 | * | 11/2018 | De Fazio | G05B 15/02 |
| 2012/0297678 A1 | * | 11/2012 | Luebbers | A01G 31/02 47/62 A |
| 2013/0305603 A1 | * | 11/2013 | Azoulay | A01G 2/00 47/60 |
| 2016/0235023 A1 | * | 8/2016 | Thoma | A01G 31/02 |

* cited by examiner

Primary Examiner — Andrea M Valenti
(74) Attorney, Agent, or Firm — Knobbe Martens Olson & Bear LLP

(57) ABSTRACT

An incubator is disclosed. In one aspect, the incubator includes a housing, a reservoir disposed in the housing, and a vaporizer disposed in the housing so as to receive liquid collected in the reservoir. In certain embodiments the incubator includes a tray supported by the housing and disposed above at least a portion of the reservoir.

20 Claims, 12 Drawing Sheets

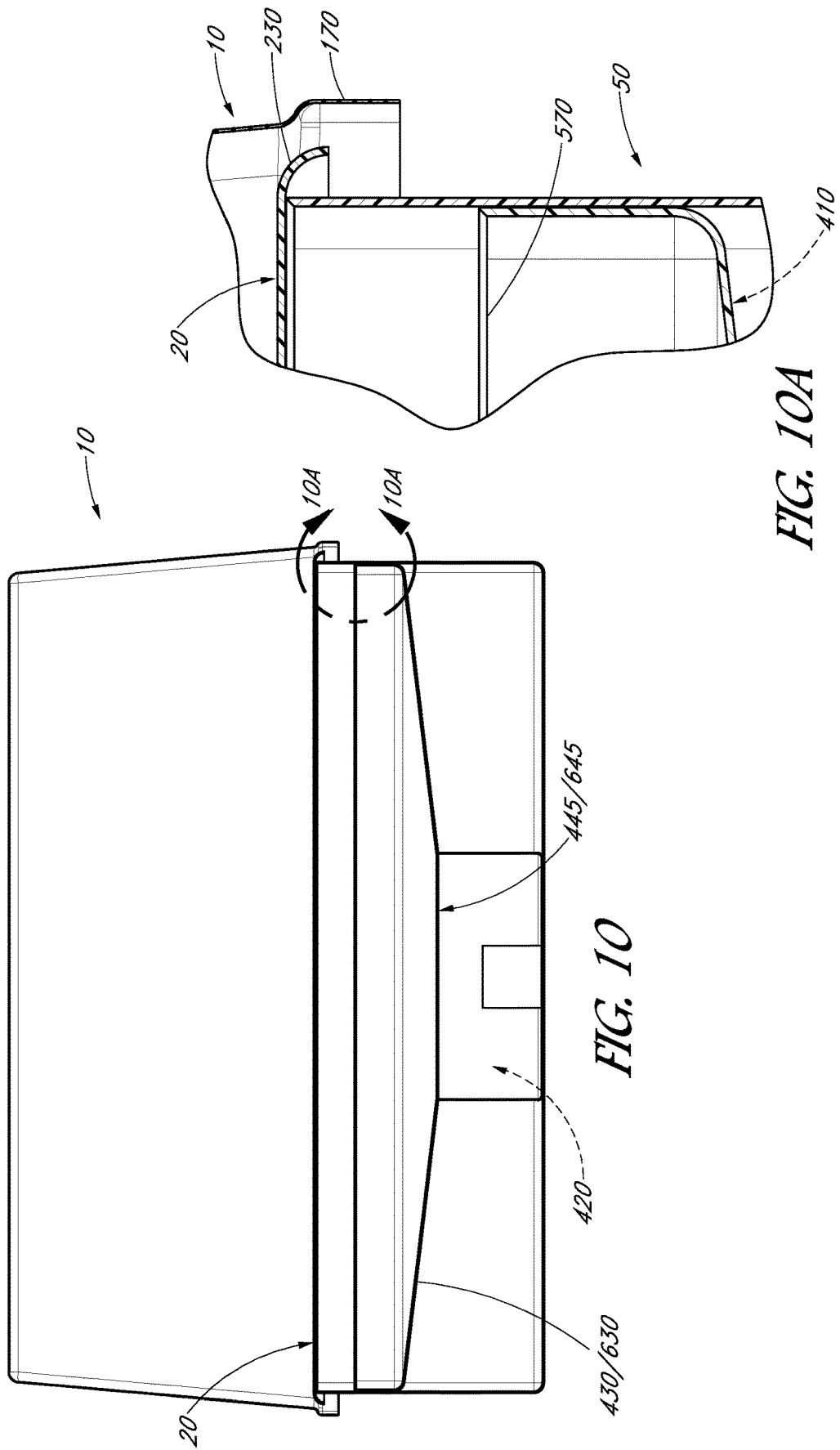

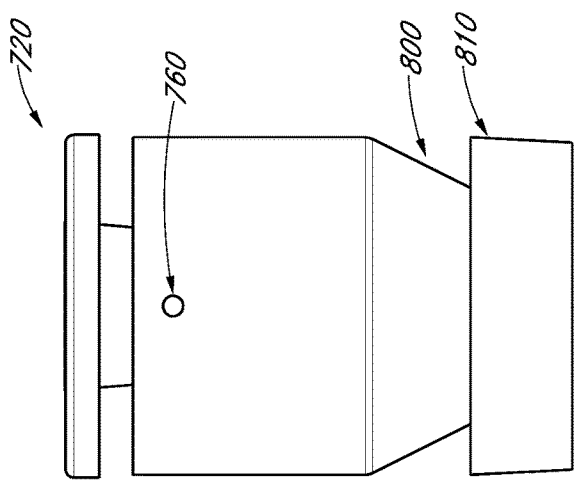
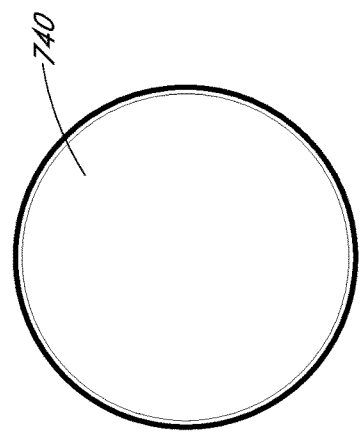
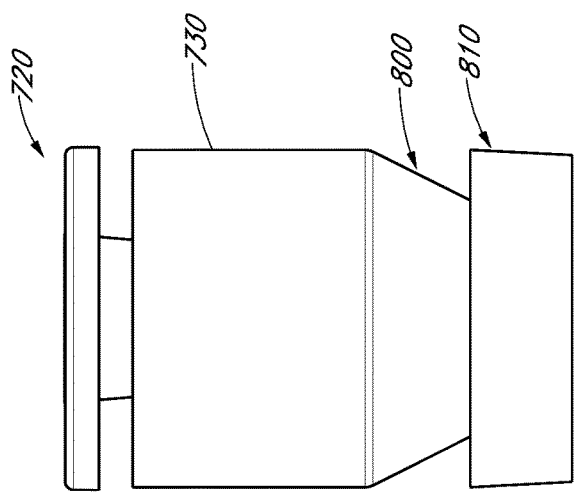
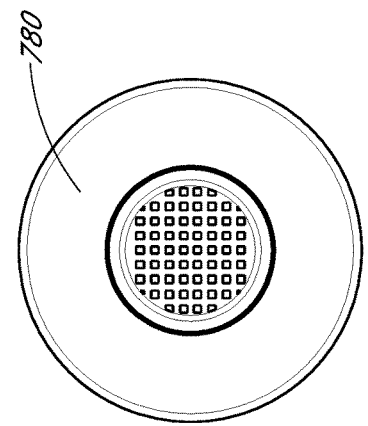
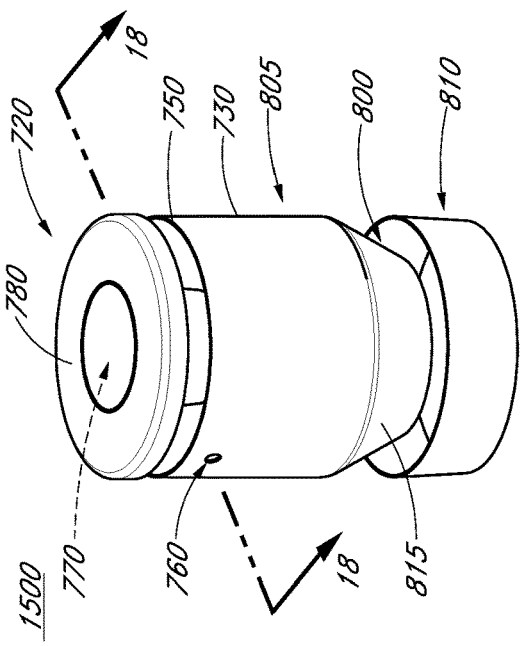
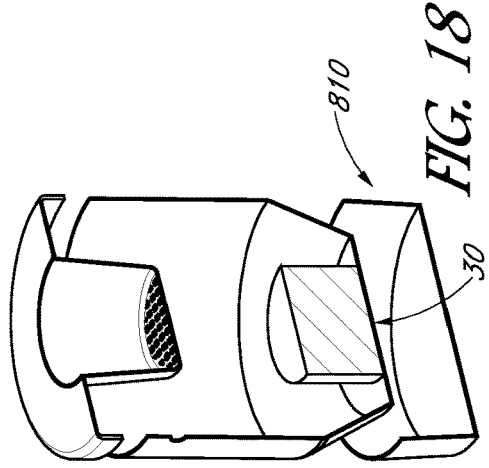

PLANT PROPAGATION INCUBATOR

BACKGROUND

Field

This disclosure relates to an incubator for growing plants and a kit including components of the incubator.

Description of the Related Technology

Efficiently growing plants has drawn interest due to environmental and cost factors. Typically in a standard plant propagation apparatus water is applied to the plant growth media and then seeps down gradually until it contacts the root region or germination region of the plant material. Water is required for the normal physiological processes of all plants and is an essential component in photosynthesis and plant metabolism. There remains a need to efficiently grow plants using less water and less energy that addresses the separate physiological needs of the shoot region and the root or germination region during plant growth.

SUMMARY

Some embodiments provide an incubator including a housing, a reservoir residing in the housing, a vaporizer disposed in the housing so as to receive liquid collected in the reservoir; and a tray supported by the housing and disposed above at least a portion of the reservoir, the tray having one or more cells, each cell being sized and shaped to support content selected from the group consisting of plant material and a growth substrate within the incubator.

Some embodiments provide an incubator kit including a housing, a reservoir which can be placed in the housing, a vaporizer which can be placed in the reservoir, and a tray supported by the housing and disposed above at least a portion of the reservoir, the tray having one or more cells, each cell being sized and shaped to support content selected from the group consisting of plant material and a growth substrate within the incubator.

Some embodiments provide a single plant incubator including a housing, a vaporizer residing in the housing, and a tray supported by the housing and having a cell, the cell being sized and shaped to support content selected from the group consisting of plant material and a growth substrate within the incubator.

BRIEF DESCRIPTION OF THE DRAWINGS

FIG. 8A is an expanded view from FIG. 8 showing a portion of the incubator.

FIG. 10 is a cross-section side view similar to FIG. 3 of the incubator from FIG. 1 or a cross-section side view of the incubator from FIG. 9 in an assembled state showing a gradient of the condensation collection unit.

FIG. 10A is an expanded view from FIG. 10 showing a portion of the incubator.

FIG. 17 is a perspective view of another embodiment of a single plant incubator showing a housing having a conically narrowing section.

FIG. 18 is a cross-sectional view of the single plant incubator of FIG. 17 including a vaporizer where the tray top cell bottom opening has a mesh screen across the opening.

FIG. 19 is a side view of the single plant incubator of FIG. 17.

FIG. 20 is an opposite side of the single plant incubator of FIG. 17 showing a wall hole for a power cord.

FIG. 21 is a top view of the single plant incubator of FIG. 17.

FIG. 22 is a bottom view of the single plant incubator of FIG. 17.

DETAILED DESCRIPTION

Figure 1:
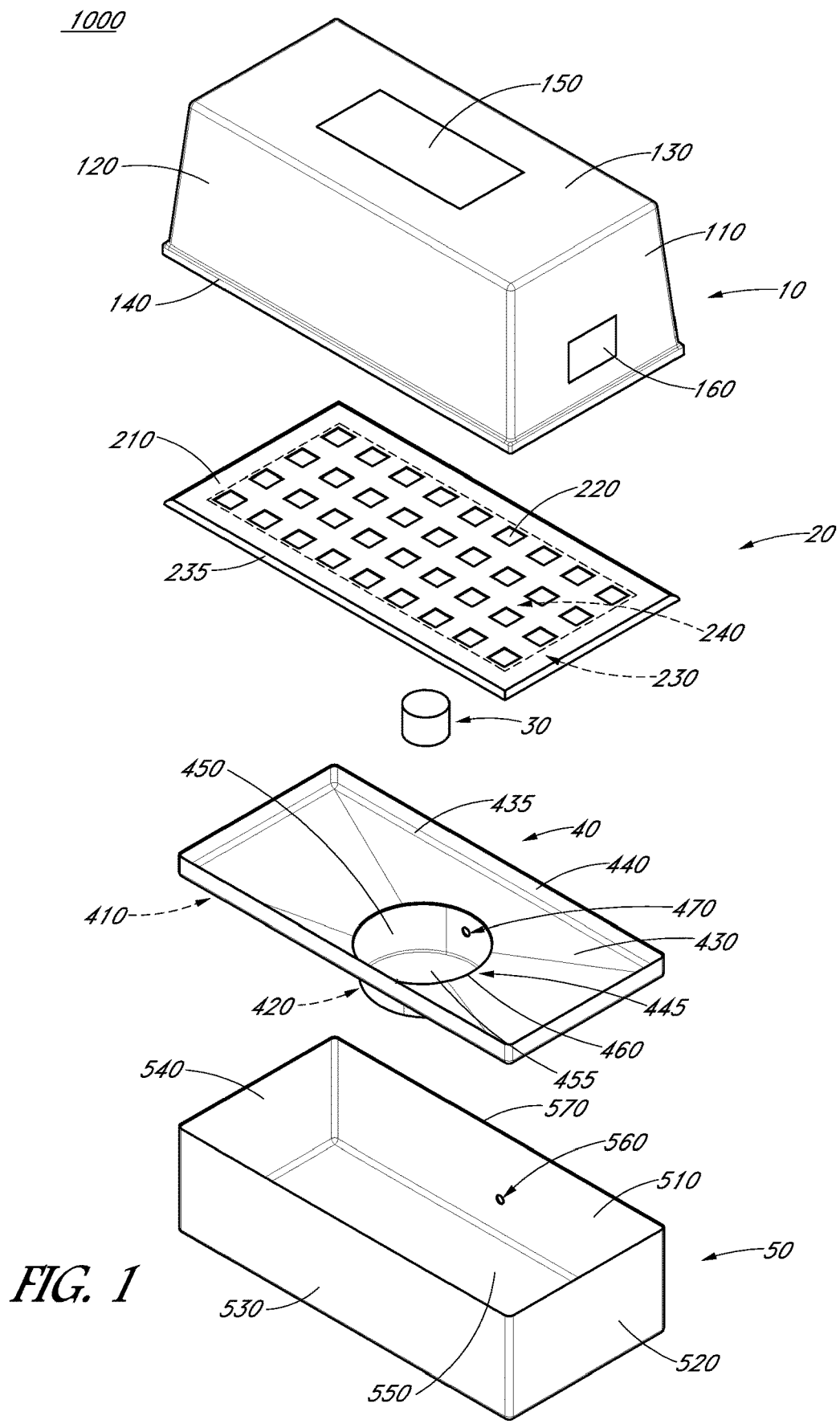
FIG. 1 is an exploded view of an incubator including a housing, a reservoir, a vaporizer, a tray, and a cover according to a preferred embodiment of the present invention.

As the described technology allows for various changes and numerous embodiments, particular embodiments will be illustrated in the drawings and described in detail in the written description. However, this is not intended to limit the described technology to particular modes of practice and it is to be appreciated that all changes, equivalents, and substitutes that do not depart from the spirit and technical scope of the described technology are encompassed in the described technology.

While such terms as "first," "second," etc., may be used to describe various components, such components must not be limited to the above terms. The above terms are used only to distinguish one component from another.

The terms used in the present specification are merely used to describe particular embodiments and are not intended to limit the described technology. Expressions used in the singular encompass the expression in the plural, unless the context clearly indicates otherwise. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It will be understood that when a component is referred to as being "on" another component, it can be directly on the component, or one or more additional components intervening them may also be present. Like reference numerals designate like elements throughout the specification.

Figure 6:
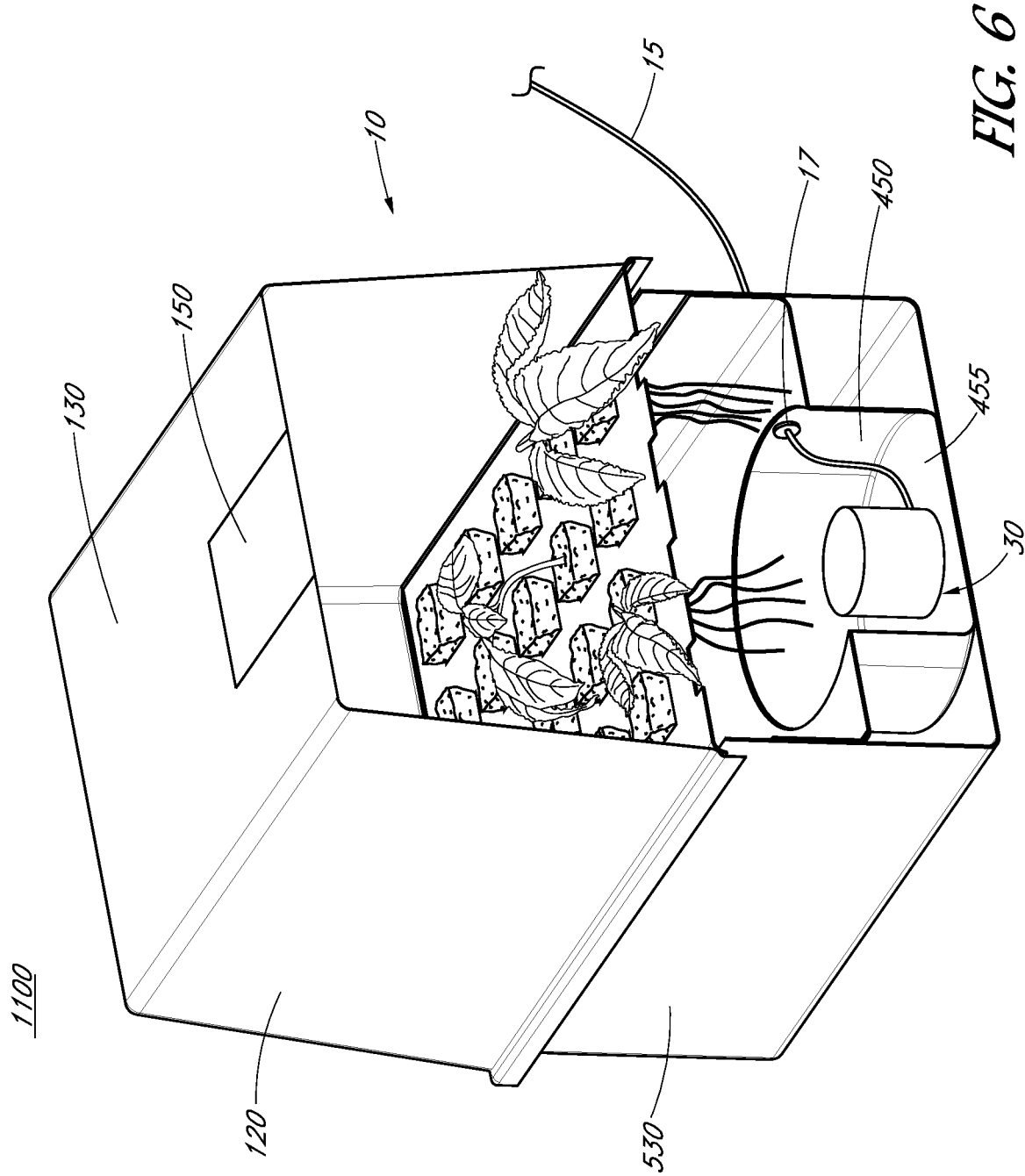
FIG. 6 is a cross-sectional view through the incubator of FIG. 1 and further includes a plurality of plants located in the tray.

FIG. 1 is an exploded view of an incubator 1000 including a housing 50, a reservoir 40, a vaporizer 30, a tray 20, and a cover 10. In some embodiments, the vaporizer 30 includes a connector 15 (such as shown in FIG. 6).

In an aspect the vaporizer includes a power connector having a plug (not shown). In some embodiments, the housing 50 includes a first side 510, a second side 520, a third side 530, a fourth side 540 and a bottom 550. The first side 510 may include hole 560 where the connector 15 (such as shown in FIG. 6) may pass through the first side 510. A grommet/gasket 17 (such as shown in FIG. 6) may fill the hole 560 to prevent moisture from exiting the incubator 1000. In some embodiments, the housing 50 includes a top opening having a lip 570 defining the opening where the tray 20 is disposed on and overlaps the lip 570 in an assembled state. In some embodiments, the housing 50 includes an integrated environmental control unit (not shown).

In an aspect, the diameter of hole 560 may be large enough to allow the plug of the power connector to pass through. In some embodiments, the diameter of the hole 560 may be from about 10 mm to about 35 mm. In some embodiments, the vaporizer 30 may be a commercial item sold by AGPtek® (Brooklyn, N.Y. 11214) and described as a mist maker which includes an atomizing nozzle.

In some embodiments, the reservoir 40 includes a condensation collection unit 410 and a bottom tray 420. In an aspect, the condensation collection unit 410 includes a top surface 430, a top edge 435 where the condensation collection unit edge connects to rim 440 and top surface opening 445. The condensation collection unit 410 has a slope towards opening 445 to facilitate collecting or added liquid to enter the bottom tray 420. In some embodiments, the slope of any portion of the condensation collection unit 410 toward opening 445 is a grade ranging from about 0.05% to about 20%. In some embodiments, the slope of any portion of the condensation collection unit 410 toward opening 445 is a grade ranging from about 0.1% to about 15%. In some embodiments, the slope of any portion of the condensation collection unit 410 toward the condensation collection unit top surface opening 445 is a grade ranging from about 0.1% to about 10%. In some embodiments, the slope of any portion of the water reservoir condensation collection unit 410 toward the condensation collection unit top surface opening 445 is a grade ranging from about 1% to about 10%. In some embodiments, the slope of any portion of the condensation collection unit 410 toward the condensation collection unit top surface opening 445 is a 0.1%, 1%, 2%, 3%, 4%, 5%, 6%, 7%, 8%, 9%, 10%, 11%, 12%, 13%, 14%, or 15% grade, or a grade within a range defined by any of the preceding numbers.

In an aspect, the bottom tray 420 includes a wall 450. The wall 450 can have a circular shape or other shape. The bottom tray 420 can include a bottom 455 connecting to the wall 450. An edge 460 connects the condensation collection unit 410 and the bottom tray 420. A hole 470 may be provided for a connector 15 (such as shown in FIG. 6) to pass through the wall 450. In an aspect, the diameter of the hole 470 may be large enough to allow the plug of the connector 15 to pass through. In some embodiments, the diameter of the continuous circular wall hole 470 may be from about 10 mm to about 35 mm. In an aspect, one or more grommets/gaskets 17 fill the hole 560 (such as shown in FIG. 6) and/or the hole 470 (not shown) to prevent moisture from exiting the plant propagation incubator 1000. In some embodiments, the wall 450 may conically narrow in a direction toward the bottom 455.

In some embodiments, the tray 20 includes a top surface 210, an interior portion 240 where the interior portion is within the broken lines (broken lines for illustrative purposes only) comprising at least one cell 220 defining a plant material position to be filled during use, and an edge portion 230. The edge portion 230 is generally bounded by the broken lines and an edge 235. In an aspect, the at least one cell 220 is filled with at least one content selected from the group consisting of plant material and a growth substrate. In an aspect, the at least one cell includes a vessel. In some embodiments, the vessel may be a receptacle for material. In some embodiments, the material may be plant growth media. In some embodiments, the vessel includes a component selected from the group consisting of a netting, a mesh, a screen, a basket, a dish, a tube, a flask, a plate, a jar, a membrane, a paper, a film, a raft, a bag, a tray, a slide, a bottle, and the like. In some embodiments, the vessel includes a petri dish or test tube. In some embodiments, the vessel includes a modified petri dish or modified test tube. In some embodiments, the cover 10 includes a first side 110, a second side 120, a third side (substantially parallel to first side 110), a fourth side (substantially parallel to second side 120), a top 130 and a bottom opening having a lip 140 defining an opening where the lip 140 is disposed on the tray edge portion 230 in an assembled state. In some embodiments, the top 130 or at least one side includes an integrated environmental control unit 150. In an aspect, the environmental control unit 150 can manipulate air flow (via vents or fans) to control the environment within the incubator 1000. In some embodiments, the top 130 or at least one side includes integrated sensors/controllers/data loggers 160 such as timers, light/humidity/temperature sensors, and the like. In an aspect, the sensors/controllers/data loggers 160 assess and control timers, lights, humidifiers, dehumidifiers, heating, ventilation, air filtration and air conditioning within incubator 1000.

Figure 2:
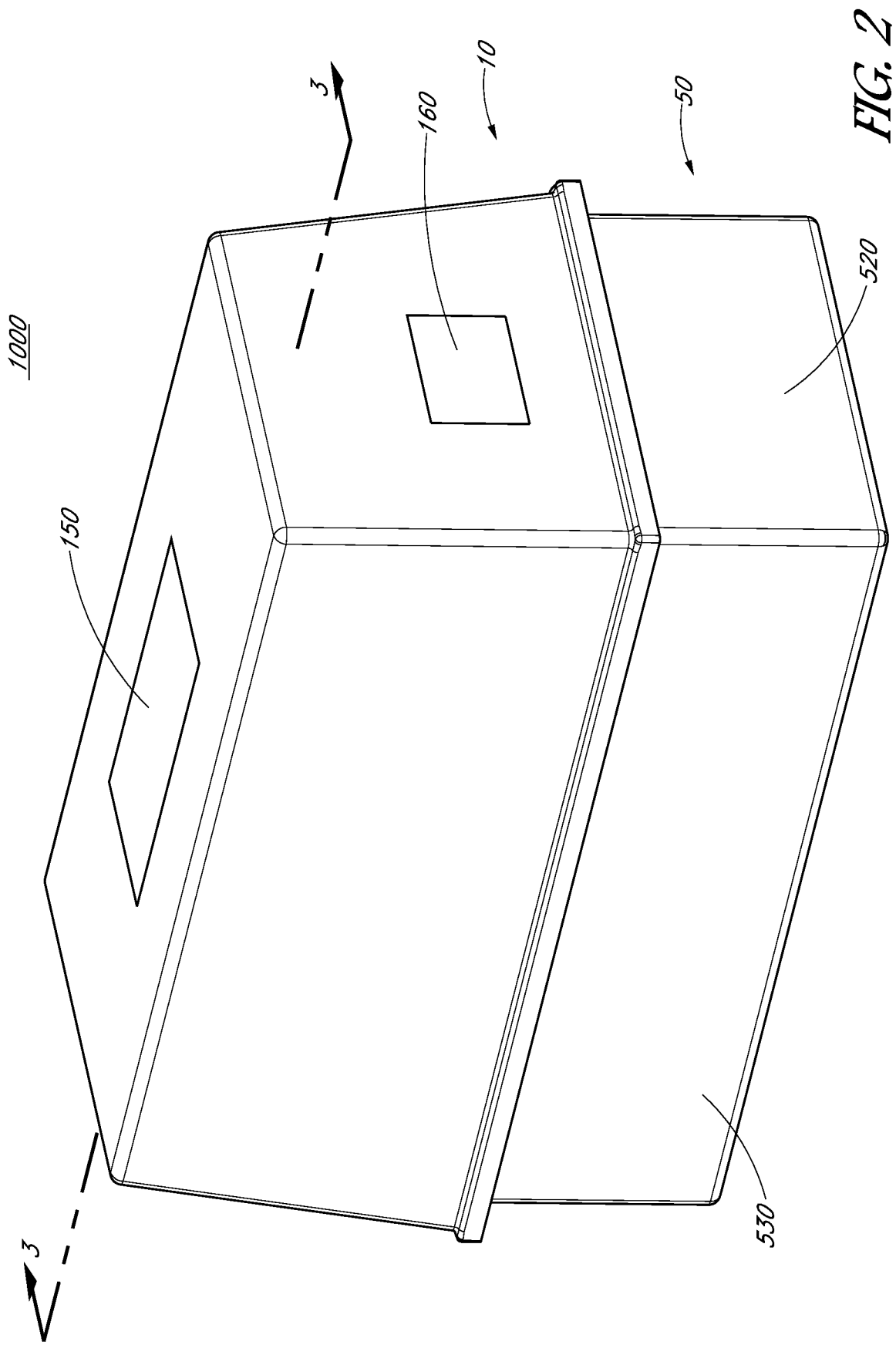
FIG. 2 is a perspective view of the incubator of FIG. 1 in an assembled state showing the cover located on the housing.

FIG. 2 is an opposite side perspective view of the incubator 1000 in an assembled state showing a cover 10 located on the housing 50 according to a preferred embodiment of the present invention.

Figure 3:
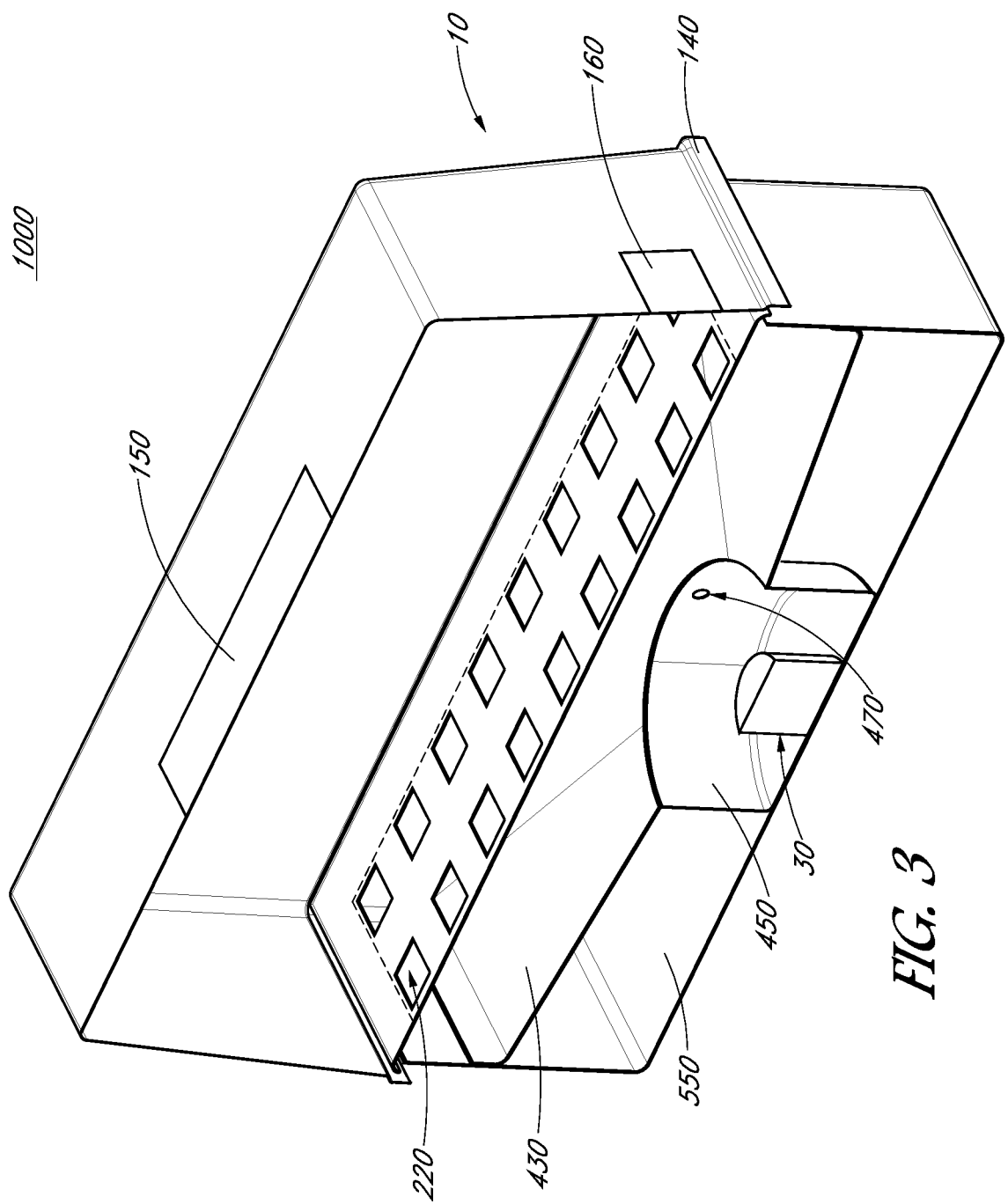
FIG. 3 is a cross-sectional view through the incubator of FIG. 1 showing a condensation collection unit and a bottom tray of the reservoir.

FIG. 3 is a cross-sectional view through the incubator of FIG. 2 showing the tray 20 disposed in the housing 50, the reservoir 40, and the vaporizer 30 located in the reservoir 40 with the plant material omitted to allow observation of the slope of the condensation collection unit 410.

Figure 4:
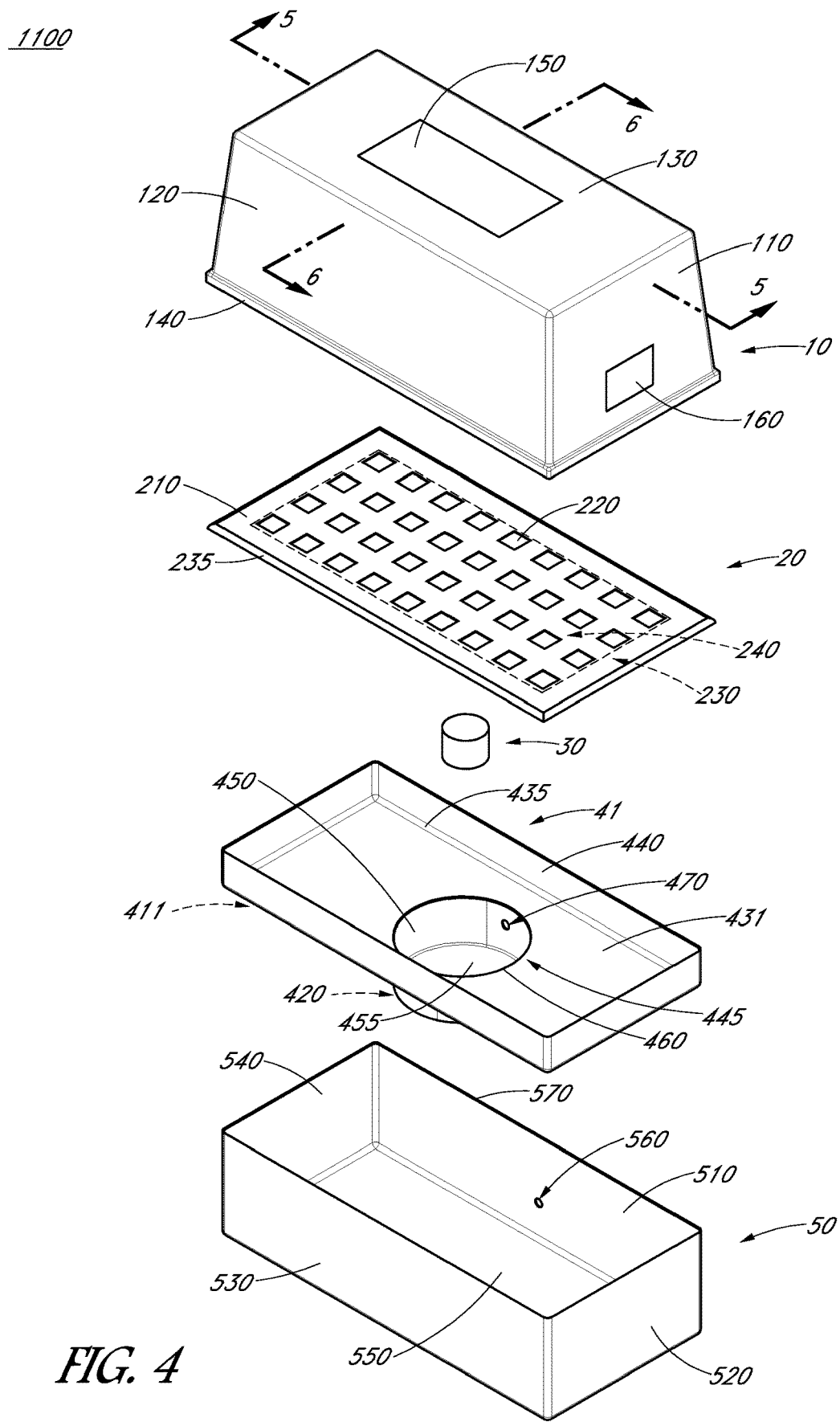
FIG. 4 is an exploded view of another embodiment of an incubator that is similar to the incubator of FIG. 1 except the condensation collection unit is flat or nearly flat.

FIG. 4 is an exploded view of incubator 1100 including a housing 50, a reservoir 41, a vaporizer 30, a tray 20, and a cover 10. An edge 435 of the condensation collection unit connects to a rim 440. An opening 445 is disposed in the condensation collection unit 411. In this embodiment, the condensation collection unit 411 is flat or nearly flat.

In some embodiments, a component (not shown) having features to facilitate collecting or added liquid to enter the bottom tray 420 may be disposed on the condensation collection unit top surface 431. In some embodiments, the component may be a conical insert having a central opening where a surface contacting the condensation collection unit top surface 431 is flat or nearly flat and another surface has a grade ranging from about 0.05% to about 20%. In some embodiments, the central opening of the conical insert is disposed to correspond to the top surface opening 445. In some embodiments, the slope is a grade ranging from about 0.1% to about 15%. In some embodiments, the slope is a grade ranging from about 0.1% to about 10%. In some embodiments, the slope is a grade ranging from about 1% to about 10%. In some embodiments, the slope is a 0.1%, 1%, 2%, 3%, 4%, 5%, 6%, 7%, 8%, 9%, 10%, 11%, 12%, 13%, 14%, or 15% grade, or a grade within a range defined by any of the preceding numbers.

Figure 5:
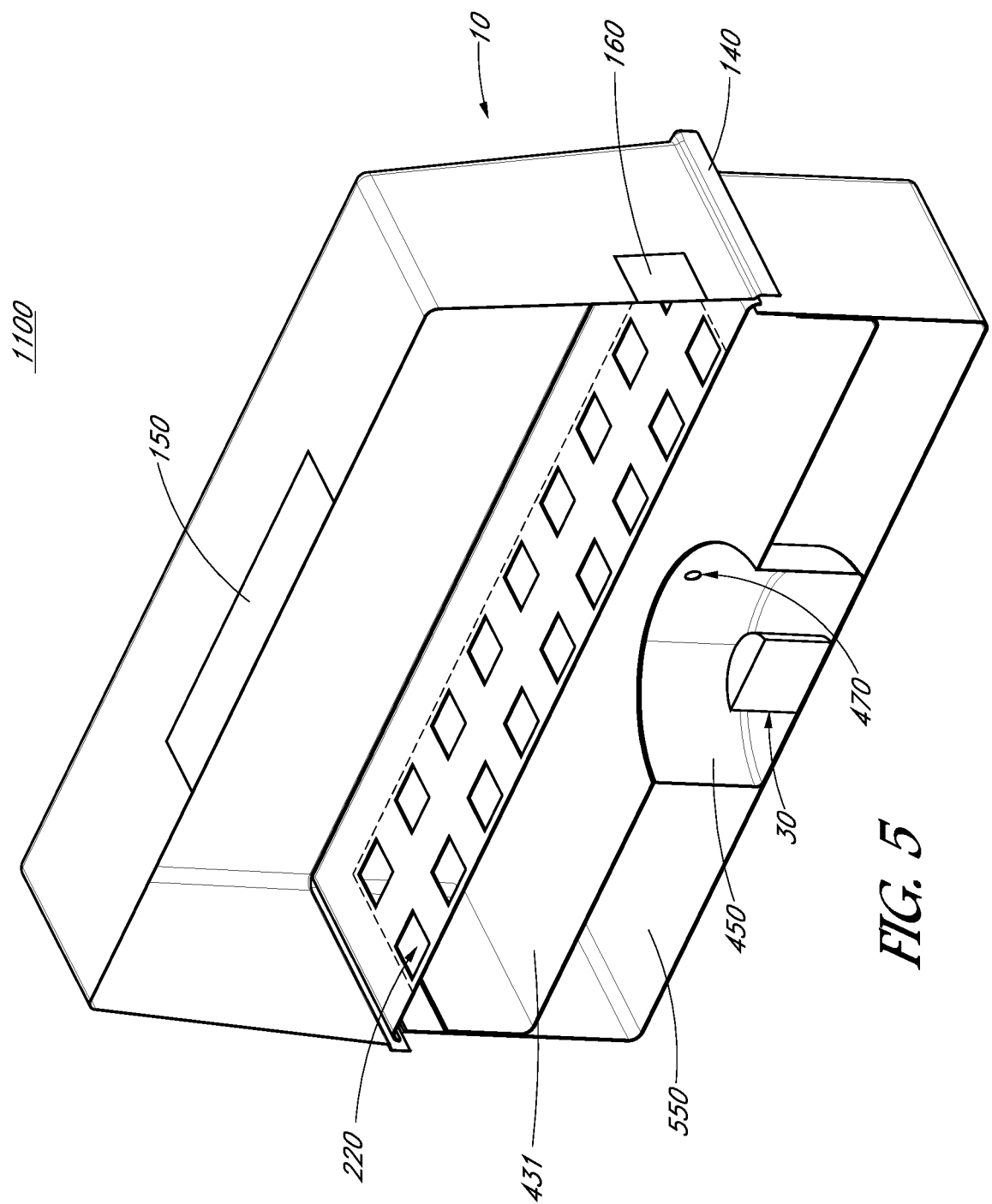
FIG. 5 is a cross-sectional view through the incubator of FIG. 4 showing the condensation collection unit and a bottom tray of the reservoir.

FIG. 5 is a cross-sectional view through the incubator 1100 of FIG. 4 in an assembled state showing the tray 20 disposed in the housing 50, the reservoir 41, and the vaporizer 30 located in the reservoir 41 with the plant material and optional component omitted to allow observation that the condensation collection unit 411 is flat or nearly flat.

FIG. 6 is a cross-sectional view through the incubator 1100 of FIG. 4 and further includes a plurality of plants located in the cells defining a plant material position of the tray for plants 20. In FIG. 6, the vaporizer 30 includes the connector 15 and a grommet/gasket 17 is disposed in the hole 560.

Figure 7:
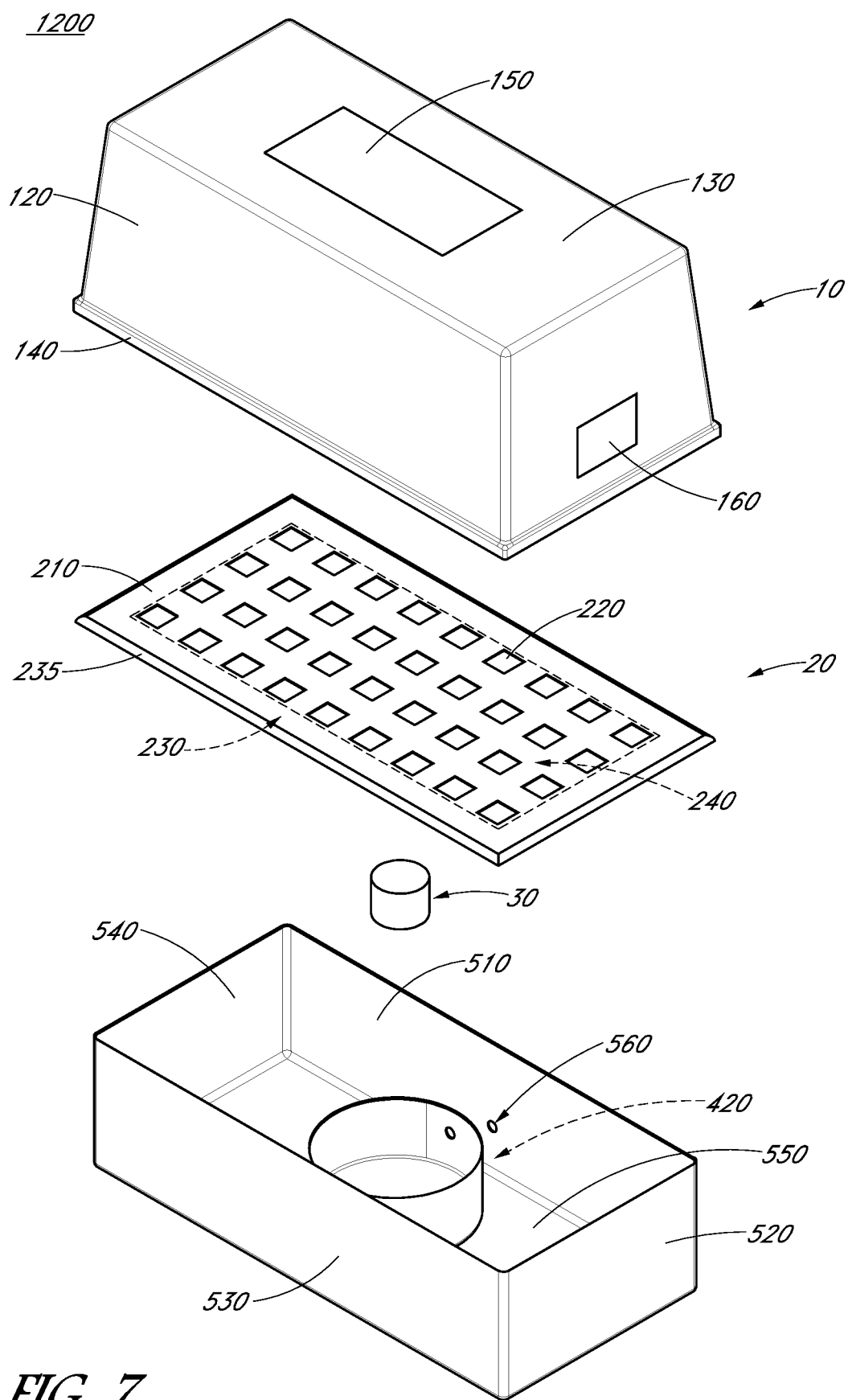
FIG. 7 is an exploded view of another embodiment of an incubator that is similar to the incubator of FIG. 1 or FIG. 4 but omits the condensation collection unit from the reservoir.
Figure 8:
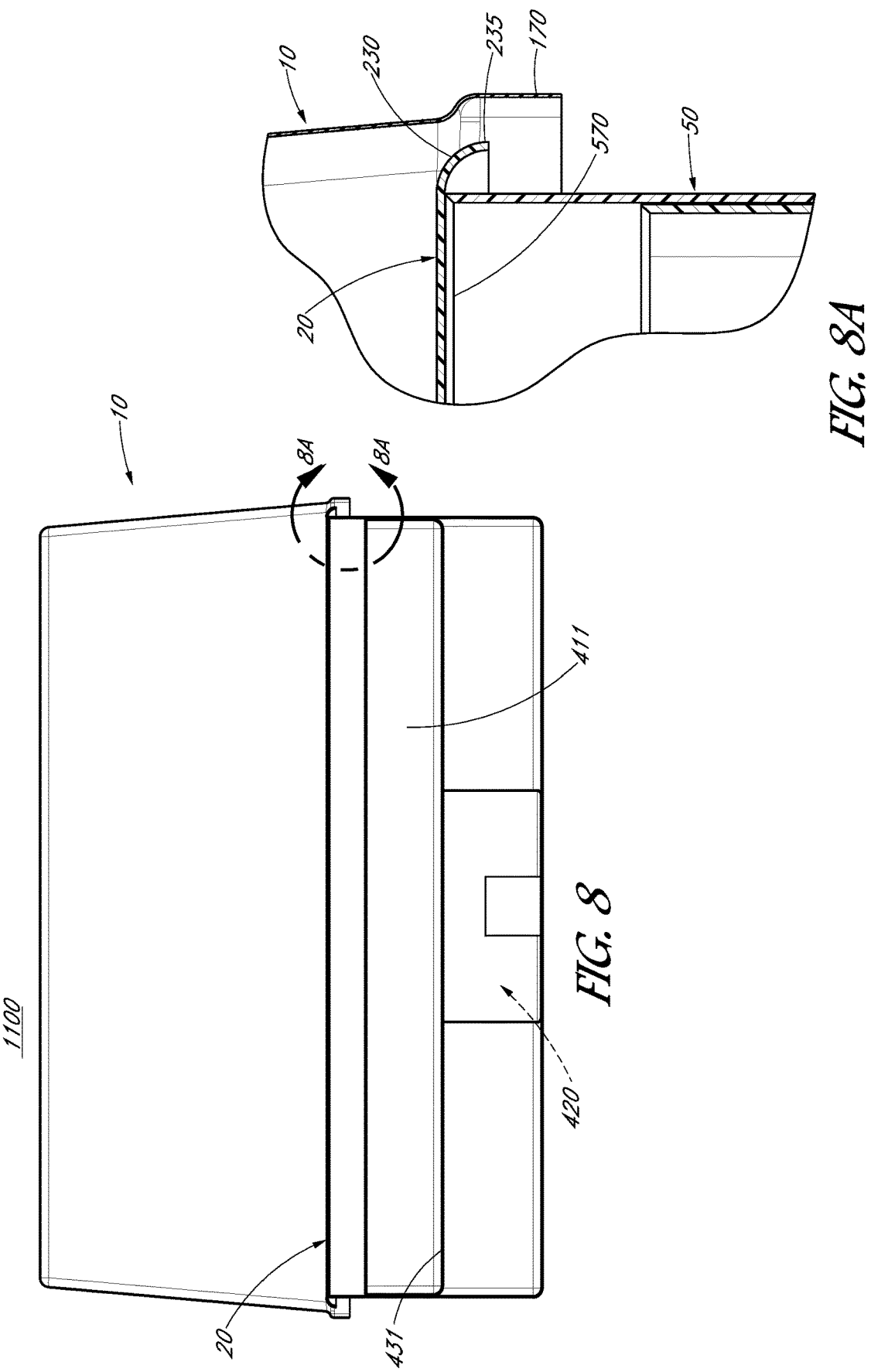
FIG. 8 is a cross-section side view similar to FIG. 5 of the incubator from FIG. 4 showing exemplary positioning of the bottom tray relative to the condensation collection unit.

FIG. 7 is an exploded view of another embodiment of an incubator 1200 that is similar to the incubator of FIG. 1 or FIG. 4 but omits the condensation collection unit 410 from the reservoir 40. In some embodiments, the condensation collection unit 410 is an integrated component of the reservoir 40. Some alternative embodiments, such as shown in FIG. 8, provide a reservoir 40 where the bottom tray 420 and the condensation collection unit 411 are separate components. The condensation collection unit 411 is disposed on the bottom tray 420 in an assembled state. In some embodiments such as shown in FIG. 8, the condensation collection unit 411 has a slope. In some embodiments where the condensation collection unit 411 is a separate component, the condensation collection unit 411 is flat or nearly flat (as shown) in an assembled state. In some embodiments where the condensation collection unit 411 is a separate component, a component (not shown) having features to facilitate collecting or added liquid to enter the bottom tray 420 may be disposed on the condensation collection unit surface 431 where the condensation collection unit 411 is flat or nearly flat in an assembled state. In some embodiments, the component may be a conical insert having a central opening where a surface contacting the top surface 431 is flat or nearly flat and another surface has a grade ranging from about 0.05% to about 20%. In some embodiments, the central opening of the conical insert is disposed to correspond to opening 445. In some embodiments, the slope is a grade ranging from about 0.1% to about 15%. In some embodiments, the slope is a grade ranging from about 0.1% to about 10%. In some embodiments, the slope is a grade ranging from about 1% to about 10%. In some embodiments, the slope is a 0.1%, 1%, 2%, 3%, 4%, 5%, 6%, 7%, 8%, 9%, 10%, 11%, 12%, 13%, 14%, or 15% grade, or a grade within a range defined by any of the preceding numbers.

FIG. 8 is a cross-section side view similar to FIG. 5 of the incubator 1100 from FIG. 4 showing exemplary positioning of the bottom tray 420 relative to the condensation collection unit 411.

In some embodiments, a component (not shown) having features to facilitate collecting or added liquid to enter the bottom tray 420 may be disposed on the top surface 431. In some embodiments, the component may be a conical insert having a central opening where a surface contacting the condensation collection unit top surface 431 is flat or nearly flat and another surface has a grade ranging from about 0.05% to about 20%. In some embodiments, the central opening of the conical insert is disposed to correspond to the top surface opening 445. In some embodiments, the slope is a grade ranging from about 0.1% to about 15%. In some embodiments, the slope is a grade ranging from about 0.1% to about 10%. In some embodiments, the slope is a grade ranging from about 1% to about 10%. In some embodiments, the slope is a 0.1%, 1%, 2%, 3%, 4%, 5%, 6%, 7%, 8%, 9%, 10%, 11%, 12%, 13%, 14%, or 15% grade, or a grade within a range defined by any of the preceding numbers.

FIG. 8A is an expanded view from FIG. 8 showing a portion of the bottom opening lip 140/170 overlapping the tray edge portion 230 and the tray edge portion 230 overlapping and extending beyond the lip 570 an assembled state. In some embodiments, the tray edge portion 230 has a curved section and the tray edge 235 is below the lip 570 in an assembled state. In some embodiments, the tray edge portion 230 is flat and in a parallel plane of the tray for plants interior portion 240 and the tray for plants edge 235 is above the lip 570 where the opening lip 170 is below both the housing top lip 570 and the tray edge portion 230 in an assembled state (not shown).

In some embodiments, the housing 50 includes an opening having a lip 570 defining the opening where the tray 20 is disposed on the lip 570 in an assembled state. In some embodiments, the housing 50 includes an opening having a lip 570 defining the opening where the tray 20 is disposed on and overlaps the lip 570 in an assembled state.

Figure 9:
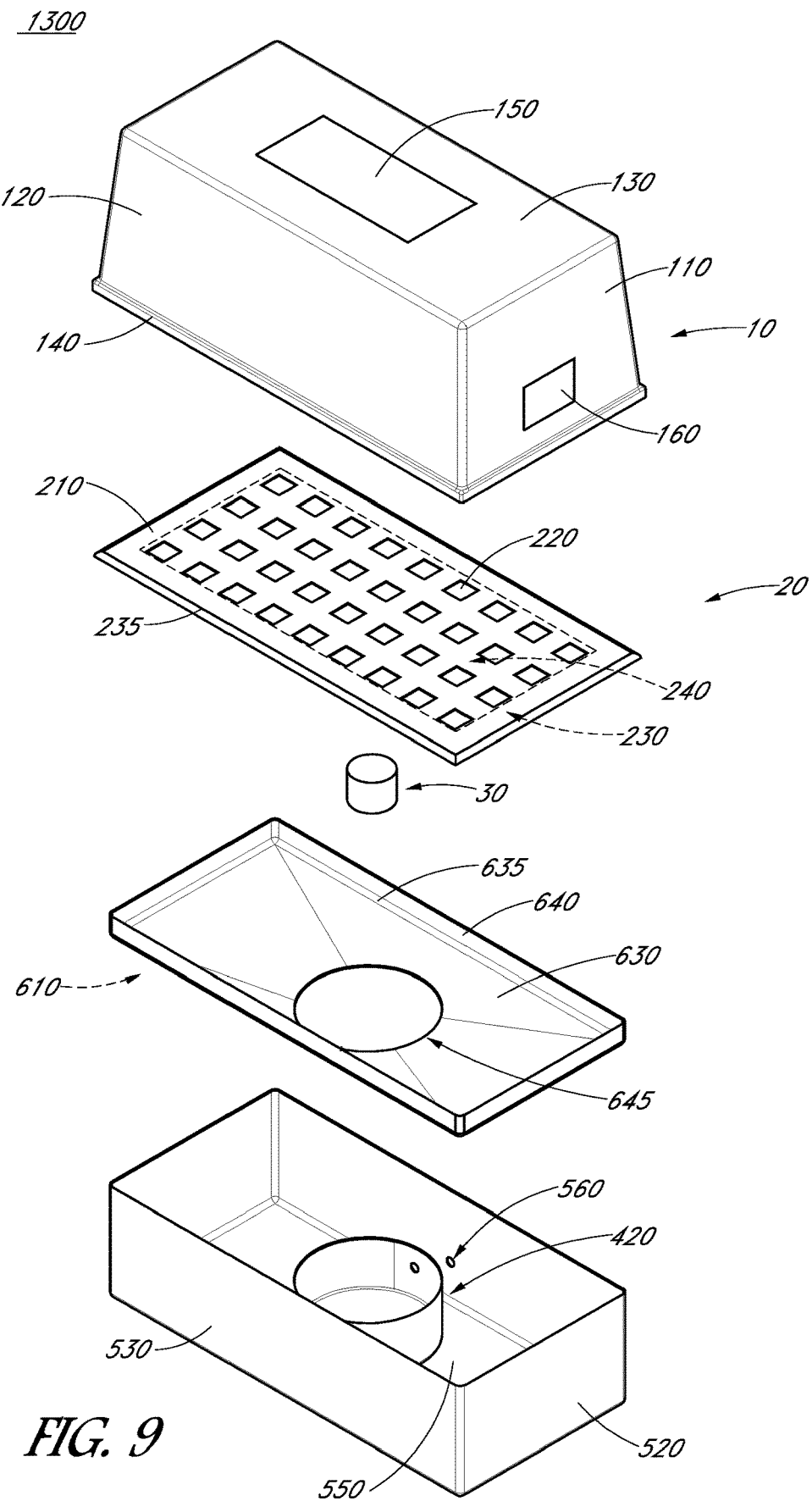
FIG. 9 is an exploded view of another embodiment of an incubator that is similar to the incubator of FIG. 1 except the reservoir includes a condensation collection unit that is separate from the bottom tray.

FIG. 9 is an exploded view of another embodiment of an incubator 1300 that is similar to the incubator 1000 of FIG. 1 except the bottom tray 420 and the condensation collection unit 610 are separate components where the condensation collection unit 610 is disposed on the bottom tray 420 in an assembled state. In an aspect, the condensation collection unit 610 includes a top surface 630, a top edge 635 where the condensation collection unit edge connects to a rim 640 and a top surface opening 645 and where the condensation collection unit 610 has a slope toward the top surface opening 645 to facilitate collecting or added liquid to enter the bottom tray 420. In some embodiments, the slope of any portion of the condensation collection unit 610 toward the top surface opening 645 is a grade ranging from about 0.05% to about 20%. In some embodiments, the slope of any portion of the condensation collection unit 610 toward the condensation collection unit top surface opening 645 is a grade ranging from about 0.1% to about 15%. In some embodiments, the slope of any portion of the condensation collection unit 610 toward the top surface opening 645 is a grade ranging from about 0.1% to about 10%. In some embodiments, the slope of any portion of the condensation collection unit 610 toward the top surface opening 645 is a grade ranging from about 1% to about 10%. In some embodiments, the slope of any portion of the condensation collection unit 610 toward the top surface opening 645 is a 0.1%, 1%, 2%, 3%, 4%, 5%, 6%, 7%, 8%, 9%, 10%, 11%, 12%, 13%, 14%, or 15% grade, or a grade within a range defined by any of the preceding numbers.

FIG. 10 is a cross-section side view similar to FIG. 3 of incubator 1000 from FIG. 1 or a cross-section side view of the plant propagation incubator 1300 from FIG. 9 in an assembled state showing the reservoir 40 disposed in the housing 50. A top surface 430/630 has a slope toward the opening 445/645 to facilitate collecting liquid or added liquid to enter the bottom tray 420.

FIG. 10A is an expanded view from FIG. 10 showing a portion of the bottom opening lip 140/170 overlapping the tray edge portion 230 and the tray edge portion 230 overlapping and extending beyond the top lip 570 and a portion of the condensation collection unit top surface 430/630. In some embodiments, the tray edge portion 230 is curved and the tray edge 235 is below the housing top lip 570 in an assembled state. In some embodiments, the tray edge portion 230 is flat and in a parallel plane with the tray interior portion 240 and the tray edge 235 is above the top lip 570 where the bottom opening lip 170 is below both the housing top lip 570 and the tray edge portion 230 in an assembled state (not shown). In some embodiments, the slope of any portion of the condensation collection unit 410 toward the top surface opening 445/645 is a 0.1%, 1%, 2%, 3%, 4%, 5%, 6%, 7%, 8%, 9%, 10%, 11%, 12%, 13%, 14%, or 15% grade, or a grade within a range defined by any of the preceding numbers.

Figure 11:
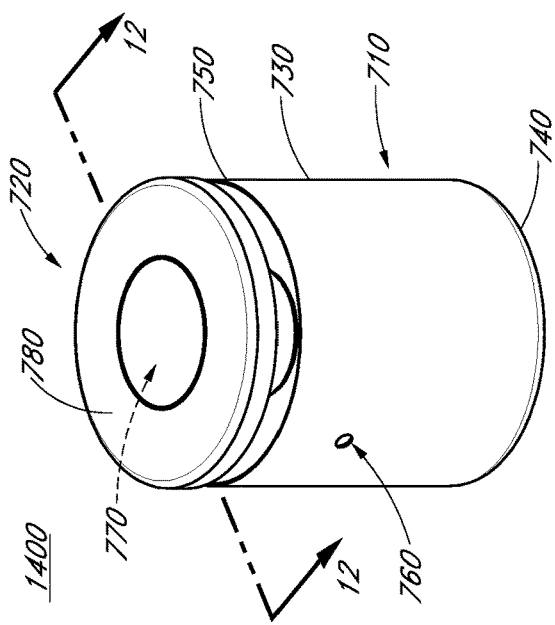
FIG. 11 is a perspective view of an embodiment of a single plant incubator showing a housing and a tray.

FIG. 11 is a perspective view of a single plant incubator 1400 showing a housing 710, a tray 720 located on the housing 710, and a vaporizer residing in the housing (not shown) in an assembled state. The housing 710 includes a wall 730, a bottom 740 connecting to the wall 730 and a top edge 750 defining an opening. The wall 730 can include a hole 760 to allow a connector to pass through the wall 730. The tray 720 includes a top 780 and a cell 770 defining a plant material position to be filled during use with at least one content selected from the group consisting of plant material and a growth substrate. In some embodiments, the cell 770 has a bottom opening where the bottom opening has a mesh screen across the bottom opening. In some embodiments, the cell 770 is defined by a circular mesh wall and bottom opening. In some embodiments, the bottom opening has a mesh screen across the bottom opening. In some embodiments, the cell 770 is defined by a circular mesh wall and bottom opening, where the bottom opening has a mesh screen across the bottom opening. In some embodiments of single plant incubator 1400, the housing 710 includes an integrated environmental control unit (not shown). In some embodiments, the housing 710 includes integrated sensors/controllers/data loggers (not shown) such as timers, light/humidity/temperature sensors, and the like. In an aspect, the sensors/controllers/data loggers assess and control timers, lights, humidifiers, dehumidifiers, heating, ventilation, air filtration and air conditioning within single plant incubator 1400.

Figure 14:
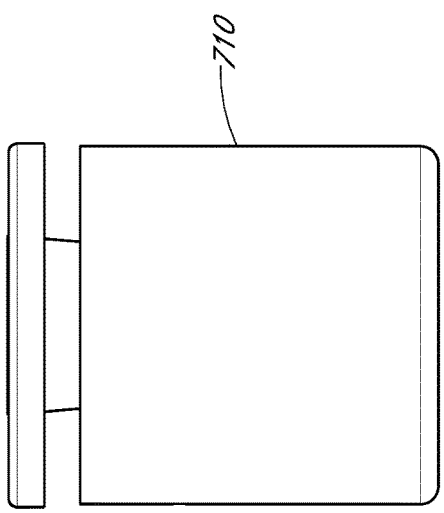
FIG. 14 is an opposite side of the single plant incubator of FIG. 11.
Figure 16:
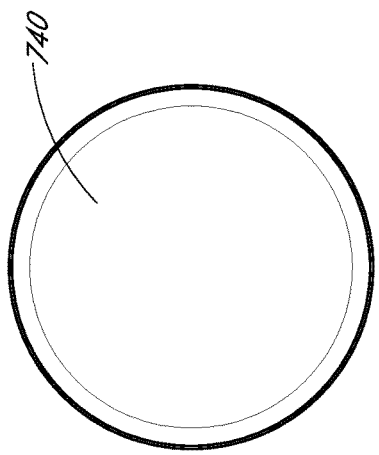
FIG. 16 is a bottom view of the single plant incubator of FIG. 11.
Figure 13:
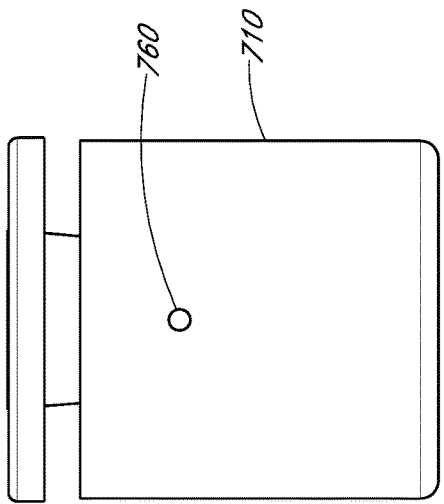
FIG. 13 is a side view of the single plant incubator of FIG. 11 showing a hole for a power cord.
Figure 15:
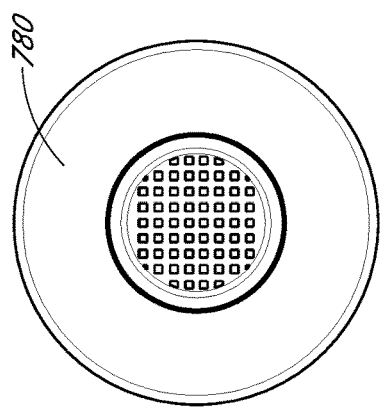
FIG. 15 is a top view of the single plant incubator of FIG. 11.
Figure 12:
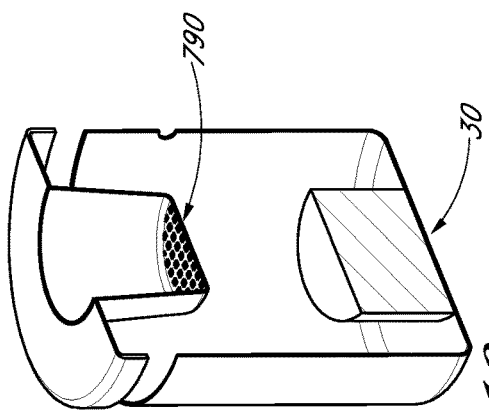
FIG. 12 is a cross-sectional view of the single plant incubator of FIG. 11 including a vaporizer.

FIG. 12 is a cross-sectional view of the single plant incubator of FIG. 11 including vaporizer 30 where the bottom opening has a mesh screen 790 across the opening. In some embodiments, the cell 770 facilitates collected or added liquid to enter the housing 710. FIG. 13 is a side view of the single plant incubator of FIG. 11 showing a hole 760 for a power cord. FIG. 14 is an opposite side of the single plant incubator of FIG. 11. FIG. 15 is a top view of the single plant incubator of FIG. 11. FIG. 16 is a bottom view of the single plant incubator of FIG. 11.

FIG. 17 is a perspective view of another embodiment of a single plant incubator 1500 showing a housing 805 having a conically narrowing section 800. In certain embodiments, the diameter of a bottom 815 is less than the diameter of the opening top edge 750. In some embodiments, the diameter of the bottom 815 is about 0.1 to about 15% less than the diameter of the opening top edge 750. In some embodiments, the diameter of the bottom 815 is 0.1%, 1%, 2%, 3%, 4%, 5%, 6%, 7%, 8%, 9%, 10%, 11%, 12%, 13%, 14%, or 15% less than the diameter of the opening top edge 750, or less than the diameter of the opening top edge 750 within a range defined by any of the preceding numbers. In some embodiments, the single plant incubator 1500 includes a housing holder 810. In some embodiments, the cell of incubator 1500 is defined by a circular mesh wall and bottom opening. In some embodiments, the bottom opening has a mesh screen across the bottom opening. In some embodiments, the cell of incubator 1500 is defined by a circular mesh wall and bottom opening, where the bottom opening has a mesh screen across the bottom opening. In some embodiments of single plant incubator 1500, the housing 710 includes an integrated environmental control unit (not shown). In some embodiments, the housing 710 includes integrated sensors/controllers/data loggers (not shown) such as timers, light/humidity/temperature sensors, and the like. In an aspect, the sensors/controllers/data loggers assess and control timers, lights, humidifiers, dehumidifiers, heating, ventilation, air filtration and air conditioning within single plant incubator 1500.

FIG. 18 is a cross-sectional view of the single plant incubator from FIG. 17 including vaporizer 30 where the tray top cell bottom opening has a mesh screen 780 across the opening. FIG. 19 is a side view of the single plant incubator from FIG. 17. FIG. 20 is an opposite side of the single plant incubator from FIG. 17 showing wall hole 760 for a power cord. FIG. 21 is a top view of the single plant incubator from FIG. 17. FIG. 22 is a bottom view of the single plant incubator of FIG. 17.

In some embodiments of an incubator as disclosed and described herein, the vaporizer is configured to reside below the tray and below or level with the root or germination region of the plant material.

In some embodiments of an incubator as disclosed and described herein, humidity in the cover area is different than the humidity in the housing area. In some embodiments of an incubator as disclosed and described herein, the vaporizer is configured to control humidity in the cover area without any additional mechanisms. In some embodiments of an incubator as disclosed and described herein, the cover filters light, and maintains humidity and temperature.

In some embodiments of an incubator as disclosed and described herein, the vaporizer is configured to actively maintain moisture, temperature and aeration/oxygen levels during operation and provide a temperate, moist and oxygenated environment for rooting.

In some embodiments of an incubator as disclosed and described herein, the vaporizer is configured to use purified water such as reverse osmosis or distilled water which may mitigate salt accumulation and pH shift over time during the plant growth period.

In some embodiments of an incubator as disclosed and described herein, the vaporizer is configured to control humidity within the cover area without any additional mechanisms, temperature and light are passively controlled by the output of the ultrasonic fogger which flows into this region.

In some embodiments of an incubator as disclosed and described herein, the at least one cell defining a plant material position may include any type of plant material holder that allows moisture to contact the root or germination region of the plant material. In some embodiments of an incubator as disclosed and described herein, the at least one cell defining a plant material position may include a vessel, dish or tube having netting, mesh, or a screen to allow moisture to contact the root or germination region of the plant material.

In some embodiments of an incubator as disclosed and described herein, plant growth is accelerated and issues of stagnant water conditions, such as growth of bacteria, algae, mold, pests, and the like may be mitigated.

In some embodiments of an incubator as disclosed and described herein, passive flow between the cover area and the housing area eliminates the need for conduit, tubing, pressurized air/gas, fans, manifolds, pumps, and the like.

In some embodiments an incubator as disclosed and described herein does not need additional components or devices for growing plants such as air pressure, water pressure, tubes, conduit, fans, pumps, and filtration.

In some embodiments, an incubator as disclosed and described herein can facilitate noticeable root development in 6-10 days versus 21 or more days in a standard plant propagation apparatus. In some embodiments, an incubator as disclosed and described herein can facilitate noticeable root development in 2-7 days versus 10 or more days in a standard plant propagation apparatus. In some embodiments, an incubator as disclosed and described herein can facilitate noticeable root development in 7-35 days versus 40 or more days in a standard plant propagation apparatus. In some embodiments, an incubator as disclosed and described herein can facilitate noticeable root development in 14-21 days versus 30 or more days in a standard plant propagation apparatus.

In some embodiments, the incubator may further include a cover over the tray. In some embodiments, the incubator kit may further include a cover which can be placed over the tray. In some embodiments, the incubator may further include a splash barrier configured to prevent liquid from splashing onto plant growth media or a growth substrate and the tray. In some embodiments, the incubator may further include a root barrier configured to prevent roots from resting in liquid or interfering with vaporizer function.

In some embodiments of an incubator or kit, the vaporizer comprises a connector. In some embodiments of an incubator or kit, the housing comprises a side that includes a hole sized and shaped to receive the connector.

In some embodiments of an incubator or kit, the reservoir comprises a condensation collection unit and a bottom tray, wherein the condensation collection unit comprises a top surface and an opening, and wherein the bottom tray is in flow communication with the opening.

In some embodiments of an incubator or kit, the housing comprises a housing first side, a housing second side, a housing third side, a housing fourth side and a housing bottom, where the a housing first side includes a side hole where the connector passes through the side hole. In some embodiments of an incubator or kit, the reservoir comprises a condensation collection unit and a bottom tray; and the tray comprises at least one cell defining a plant material position to be filled during use with at least one content selected from the group consisting of plant material and a growth substrate. In some embodiments of an incubator or kit, the connector is a power connector. In some embodiments of an incubator or kit, the reservoir may be configured to hold water or an aqueous mixture.

In some embodiments of an incubator or kit, the reservoir condensation collection unit may comprise a top surface, a top edge where the condensation collection unit edge connects to a rim and a top surface opening. In some embodiments of an incubator or kit, the condensation collection unit has a slope toward the opening to facilitate liquid entering the bottom tray. In some embodiments of an incubator or kit, the slope of any portion of the reservoir condensation collection unit toward the opening is a grade ranging from about 0.1% to 10%.

In some embodiments of an incubator or kit, the vaporizer comprises a connector, and wherein the housing comprises a side that includes a hole sized and shaped to receive the connector.

In some embodiments of an incubator or kit, the reservoir comprises a condensation collection unit and a bottom tray, wherein the condensation collection unit comprises a top surface and an opening, and wherein the bottom tray is in flow communication with the opening.

In some embodiments of an incubator or kit, the condensation collection unit has a slope toward the opening to facilitate liquid entering the bottom tray.

In some embodiments of an incubator or kit, the bottom tray may comprise a continuous circular wall, a continuous circular wall bottom connecting to the continuous circular wall and a continuous circular wall top edge where the continuous circular wall top edge connects to the condensation collection unit opening and the continuous circular wall includes a hole where the connector passes through the hole.

In some embodiments of an incubator or kit, the cover may comprise a cover first side, a cover second side, a cover third side, a cover fourth side, a cover top and a bottom opening having a lip, where the cover bottom opening lip is disposed on the tray edge.

In some embodiments of an incubator or kit, the tray may comprise at least one row of at least two cells defining a plant material position. In some embodiments of an incubator or kit, the tray may comprise at least two rows, each row comprising at least two cells defining a plant material position.

In some embodiments, the housing may include a continuous circular wall, a housing bottom connecting to the continuous circular wall and a top edge defining a housing top opening, where the continuous circular wall includes a hole to allow a connector to pass through the continuous circular wall. In some embodiments, the tray may include a top and a cell defining a plant material position to be filled during use with at least one content selected from the group consisting of plant material and a growth substrate.

In some embodiments of the single plant incubator, the cell may have a top opening, a bottom opening and a continuous circular wall connecting the top opening and the bottom opening. In some embodiments of the single plant incubator, the bottom opening may have a mesh screen across the opening. In some embodiments of the single plant incubator, the housing may have a conically narrowing section. In some embodiments, the conically narrowing section narrows in a direction toward the housing unit bottom and the diameter of the housing unit bottom is less than the diameter of the housing unit top opening. In some embodiments, the cell may be defined by a circular mesh wall and bottom opening. In some embodiments, the bottom opening has a mesh screen across the bottom opening. In some embodiments, the cell is defined by a circular mesh wall and bottom opening, where the bottom opening has a mesh screen across the bottom opening. In some embodiments of a single plant incubator, the housing includes an integrated environmental control unit. In some embodiments of a single plant incubator, the housing includes integrated sensors/controllers/data loggers such as timers, light/humidity/temperature sensors, and the like. In an aspect, the sensors/controllers/data loggers assess and control timers, lights, humidifiers, dehumidifiers, heating, ventilation, air filtration and air conditioning within single plant incubator.

It should be understood that the exemplary embodiments described herein should be considered in a descriptive sense only and not for purposes of limitation. Descriptions of features or aspects within each embodiment should typically be considered as available for other similar features or aspects in other embodiments.

While the described technology has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An incubator for plant material, the incubator comprising:
    a housing having a bottom surface, upwardly extending side walls, and an open top;
    a condensation collection unit nested in the open top of the housing to close off the open top, the condensation collection unit having a top surface and an opening disposed in the top surface;
    a reservoir disposed in the housing and below the condensation collection unit, the reservoir having a bottom tray with an upwardly extending side wall aligned and connected with the opening in the condensation collection unit so that liquid on the top surface of the condensation collection unit flows through the opening and into the bottom tray;
    a vaporizer disposed in the reservoir so as to receive the liquid collected in the bottom tray, create a vapor from the received liquid, and provide the vapor directly to a root or germination region of the plant material; and
    a tray supported by the housing and disposed above at least a portion of the condensation collection unit, the tray having a generally planar surface and one or more cells extending through the surface, each cell being sized and shaped to support an outer perimeter of content selected from the group consisting of the plant material and a growth substrate with at least a portion of the root or germination region of the plant material being located below the surface of the tray.

2. The incubator of claim 1, further comprising a cover over the tray.

3. The incubator of claim 1, wherein the vaporizer comprises a connector, and wherein the housing comprises a side that includes a hole sized and shaped to receive the connector.

4. The incubator of claim 3, wherein the upwardly extending side wall of the bottom tray has a circular shape.

5. The incubator of claim 1, wherein the one or more cells comprises at least one row of at least two cells.

6. The incubator of claim 1, wherein the one or more cells are arranged in at least two rows.

7. The incubator of claim 1, wherein the top surface of the condensation collection unit has a slope toward the opening to facilitate liquid entering the bottom tray.

8. The incubator of claim 7, wherein the slope is a grade ranging from about 0.1% to 10%.

9. An incubator kit for incubating plant material in an incubator, the incubator kit comprising:
    a housing having a bottom surface, upwardly extending side walls, and an open top;
    a condensation collection unit sized and shaped to be placed in the housing and close off the open top, the condensation collection unit having a top surface and an opening disposed in the top surface;
    a reservoir which can be placed in the housing and below the condensation collection unit, the reservoir having a bottom tray with an upwardly extending side wall aligned and connected with the opening in the condensation collection unit so that liquid on the top surface of the condensation collection unit flows through the opening and into the bottom tray;
    a vaporizer which can be placed in the reservoir so as to receive the liquid collected in the bottom tray, create a vapor from the received liquid, and provide the vapor directly to a root or germination region of the plant material; and
    a tray supported by the housing and disposed above at least a portion of the condensation collection unit, the tray having a generally planar surface and one or more cells extending through the surface, each cell being sized and shaped to support an outer perimeter of content selected from the group consisting of the plant material and a growth substrate with at least a portion of the root or germination region of the plant material being located below the surface of the tray.

10. The incubator kit of claim 9, further comprising a cover which can be placed over the tray.

11. The incubator kit of claim 9, wherein the vaporizer comprises a connector, and wherein the housing comprises a hole sized and shaped to receive the connector.

12. The incubator kit of claim 11, wherein the upwardly extending side wall of the bottom tray has a circular shape.

13. The incubator kit of claim 9, wherein the one or more cells comprises at least one row of at least two cells.

14. The incubator kit of claim 9, wherein the one or more cells are arranged in at least two rows.

15. The incubator kit of claim 9, wherein the top surface of the condensation collection unit has a slope toward the opening to facilitate liquid entering the bottom tray.

16. The incubator kit of claim 15, wherein the slope is a grade ranging from about 0.1% to 10%.

17. An incubator for plant material, the incubator comprising:
    a housing having a bottom surface, upwardly extending side walls, and an open top;
    a condensation collection unit nested in the open top of the housing to close off the open top, the condensation collection unit having a top surface and an opening disposed in the top surface;
    a reservoir disposed in the housing and below the condensation collection unit, the reservoir having a bottom tray with an upwardly extending side wall aligned and connected with the opening in the condensation collection unit so that liquid on the top surface of the condensation collection unit flows through the opening and into the bottom tray;
    a vaporizer disposed in the reservoir for creating a vapor from the liquid collected in the bottom tray, the vapor being provided directly to a root or germination region of the plant material;
    a tray supported by the housing and having a generally planar surface with one or more cells extending through the surface, each cell being sized and shaped to support an outer perimeter of content selected from the group consisting of the plant material and a growth substrate so that at least a portion of the root or germination region of the plant material is located between the surface of the tray and the reservoir; and
    a cover over the tray.

18. The incubator of claim 17, wherein the vaporizer is configured to control humidity in an area of the cover.

19. The incubator of claim 17, wherein each cell comprises a vessel.

20. The incubator of claim 17, wherein the upwardly extending side wall of the bottom tray has a circular shape.

* * * * *